(12) United States Patent
Komiya

(10) Patent No.: US 9,029,698 B2
(45) Date of Patent: May 12, 2015

(54) CABLE PROTECTION AND GUIDE DEVICE

(71) Applicant: Tsubakimoto Chain Co., Osaka (JP)

(72) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 14/210,454

(22) Filed: Mar. 14, 2014

(65) Prior Publication Data

US 2014/0305672 A1    Oct. 16, 2014

(30) Foreign Application Priority Data

Apr. 10, 2013  (JP) ................................ 2013-082522

(51) Int. Cl.
*H02G 3/04*     (2006.01)
*F16G 13/00*    (2006.01)
*F16L 3/00*     (2006.01)
*H02G 11/00*    (2006.01)

(52) U.S. Cl.
CPC .............. *H02G 3/04* (2013.01); *H02G 11/006* (2013.01)

(58) Field of Classification Search
CPC ...... F16L 3/015; H02G 11/00; H02G 11/006; H02G 3/0475; F16G 13/16
USPC .............. 174/68.3, 70 R, 72 A, 75 R, 135; 361/826; 248/70, 68.1, 49, 51; 58/78.1, 58/79.1
See application file for complete search history.

(56) References Cited

U.S. PATENT DOCUMENTS

| 3,590,854 | A | * | 7/1971 | Cork | 137/355.16 |
| 4,186,553 | A | * | 2/1980 | Fitchett | 59/78.1 |
| 4,582,281 | A | * | 4/1986 | Van Camp | 248/51 |
| 4,625,936 | A | * | 12/1986 | Hadden, Sr. | 248/544 |

FOREIGN PATENT DOCUMENTS

| JP | 05-038034 | 2/1993 |
| JP | 4658221 | 3/2011 |

* cited by examiner

*Primary Examiner* — Angel R Estrada
*Assistant Examiner* — Dimary Lopez Cruz
(74) *Attorney, Agent, or Firm* — Jianq Chyun IP Office

(57) ABSTRACT

A cable protection and guide device is provided, which prevents abrasion of the cable skin of a cable or the like and holds the position of a multi joint link with high precision. The cable protection and guide device is characterized in that the multi-joint link includes a link member and a holding member attached to the link member for holding the cable. The holding member includes a cylindrical base portion and a holding portion formed integrally with the cylindrical base portion, wherein the cylindrical base portion is engaged with a circular through hole of the link member, and the holding portion extends outward from the cylindrical base portion in a multi joint link width direction and is bifurcated for holding the cable from two sides, i.e. multi-joint link flexional inner side and multi-joint link flexional outer side. The holding member is rotatable with respect to the link member.

10 Claims, 7 Drawing Sheets

CABLE PROTECTION AND GUIDE DEVICE

CROSS-REFERENCE TO RELATED APPLICATIONS

This application claims the priority benefit of Japan application serial no. 2013-082522, filed on Apr. 10, 2013. The entirety of the above-mentioned patent application is hereby incorporated by reference herein and made a part of this specification.

BACKGROUND OF THE INVENTION

1. Field of the Invention

The present invention relates to a cable protection and guide device that securely protects and guides a flexible cable, such as an electric cable for transmitting electric signals or supplying electricity or a hose for supplying oil or air pressure, which connects a movable portion and a fixed portion of an industrial machine or a vehicle, etc.

2. Description of Related Art

According to the prior art, a known cable protection and guide device is provided with a multi-joint link that is formed by connecting a plurality of link members in a cable longitudinal direction, and the cable protection and guide device guides a cable or the like from a cable fixed end to a cable movable end and is capable of configuring in a linear position to be in contact with a support surface of a support body and a flexional position to be separated from the support surface (Patent Literatures 1 and 2, for example).

The conventional cable protection and guide device accommodates and guides the cable in the interior with flexibility.

PRIOR ART LITERATURE

Patent Literature

[Patent Literature 1] Japanese Patent Publication No. H05-38034
[Patent Literature 2] Japanese Patent No. 4658221

SUMMARY OF THE INVENTION

However, due to the structure that accommodates the cable with degree of freedom in the interior, the aforementioned conventional cable protection and guide device faces the problems that the cable skin of the cable may be grazed to generate frictional powder when the cable movable end is moved causing the cable and the cable protection and guide device to slide relatively. Further, in order to accommodate the cable therein, the cable protection and guide device may have to be larger in size and mass, which result in having a greater inertial force when the cable movable end is moved and increases the difficult of holding the position of the cable protection and guide device with high precision.

Considering the aforementioned issues, the present invention provides a cable protection and guide device that prevents abrasion of the cable skin of the cable and holds the position of the multi joint link with high precision.

In view of the above, a cable protection and guide device according to a first aspect of the present invention includes a multi joint link that is formed by connecting a plurality of link members in a cable longitudinal direction. The cable protection and guide device guides a cable or the like from a cable fixed end to a cable movable end, and is capable of configuring in a linear position to be in contact with a support surface of a support body and a flexional position to be separated from the support surface. The multi joint link includes the plurality of link members and a holding member attached to at least one part of the plurality of link members for holding the cable. The at least one part of the plurality of link members includes a connection pin formed at one end side thereof in the cable longitudinal direction, a pin hole formed at the other end side thereof in the cable longitudinal direction to be rotatably engaged with the connection pin, and a circular through hole penetrating the at least one part of the plurality of link members in a multi joint link width direction between the connection pin and the pin hole in the cable longitudinal direction. The holding member includes a cylindrical base portion engaged with the circular through hole, and a holding portion formed integrally with the cylindrical base portion, wherein the holding portion extends outward from the cylindrical base portion in the multi joint link width direction and is bifurcated for holding the cable from a multi joint link flexional inner side and a multi-joint link flexional outer side. The holding member is rotatable with respect to the at least one part of the plurality of link members.

According to a second aspect of the present invention, in addition to the aforementioned structure of the cable protection and guide device of the first aspect, the holding member is respectively disposed on a right side and a left side in the multi joint link width direction, and the holding members on the left side and the right side are connected with each other and are integrally rotatable with respect to the at least one part of the plurality of link members.

According to a third aspect of the present invention, in addition to the aforementioned structure of the cable protection and guide device of the first aspect, the holding member is respectively disposed on the right side and the left side in the multi joint link width direction, and the holding members on the left side and the right side are independently rotatable with respect to the at least one part of the plurality of link members.

According to a fourth aspect of the present invention, in addition to the aforementioned structure of the cable protection and guide device of any one of the first to the third aspects, an engaging groove is disposed on the cylindrical base portion of the holding member and extends in a circumferential direction of the cylindrical base portion, which is a rotation direction of the holding member. When the cylindrical base portion is inserted into the circular through hole, an engaging protrusion of a retaining member engaged with the at least one part of the plurality of link members is engaged with the engaging groove of the cylindrical base portion.

According to a fifth aspect of the present invention, in addition to the aforementioned structure of the cable protection and guide device of any one of the first to the fourth aspects, the holding member is formed of a flexible material.

Effect of the Invention

The cable protection and guide device of the present invention, which has the multi-joint link formed by connecting multiple link members in the cable longitudinal direction and guides the cable from the cable fixed end to the cable movable end and is capable of performing the linear position to be in contact with the support surface of the support body and performing the flexional position to be separated from the support surface, not only can protect and guide the cable but also have the following particular effects.

In the cable protection and guide device of the first aspect of the present invention, the multi joint link includes the plurality of link members and the holding member attached to the at least one part of the plurality of link members for holding the cable. The at least one part of the plurality of link members includes the connection pin formed at one end side thereof in the cable longitudinal direction, the pin hole formed at the other end side thereof in the cable longitudinal direction to be rotatably engaged with the connection pin, and the circular through hole penetrating the at least one part of the plurality of link members in the multi-joint link width direction between the connection pin and the pin hole in the cable longitudinal direction. The holding member includes the cylindrical base portion engaged with the circular through hole, and the holding portion formed integrally with the cylindrical base portion, wherein the holding portion extends outward from the cylindrical base portion in the multi-joint link width direction and is bifurcated for holding the cable from the multi joint link flexional inner side and the multi joint link flexional outer side. The holding member is rotatable with respect to the at least one part of the plurality of link members. Since the multi-joint link and the cable have approximately the same curvature radius in the flexional position, and the holding member holds the cable such that the cable does not slide relative to the holding member, abrasion of the cable skin of the cable can be prevented.

Further, in comparison with the conventional structure that the interior of the link member is made hollow where the cable is inserted therethrough, the link members of the present invention are formed compact with less mass to have less inertial force when the link members stop. Therefore, when compared with the conventional structure that the interior of the link member is made hollow where the cable is inserted therethrough, the position of the multi-joint link can be held with high precision.

Similarly, since the link members are formed compact with less mass to have less inertial force during movement, output of a power source of a device can be reduced.

In other words, a motor, etc., that serves as the power source can be miniaturized.

Since the parts are reduced in size and the number of the parts is also reduced, the fabrication costs can be lowered significantly.

Moreover, in comparison with the conventional structure that the interior of the link member is made hollow where the cable is inserted therethrough, the link members of the present invention are formed compact to avoid collision between the link members during movement. Therefore, collision noise can be reduced.

In the situation of disposing multiple cables, the cables are arranged in parallel to each other along the multi-joint link width direction and have approximately the same curvature radius when the cables are bent. Thus, problems such as breaking of the cables resulting from an excessive force on the cables caused by different curvature radii can be avoided.

Additionally, in the situation that multiple cables are disposed and held respectively at two sides along the multi joint link width direction, a repulsion force due to a bending resistance of the cables, which is generated by holding the cables C at one side of the multi joint link width direction, is compensated or reduced by a repulsion force generated in the same way at the other side of the width direction. Therefore, the forces that twist the multi joint link in certain directions can be mostly nullified.

In other words, the forces at two sides of the multi joint link width direction are well balanced, so as to prevent twisting the multi joint link and to smoothen the bending of the multi joint link.

Moreover, in the situation that the position change between the linear position and the flexional position imposes an excessive force on the cable, the holding member receiving the excessive force is automatically rotated with respect to the link member in a direction for releasing the excessive force, so as to release the excessive force. Thus, damage of the cable due to the influence of the excessive force can be prevented.

According to the cable protection and guide device of the second aspect of the present invention, in addition to the effects of the first aspect, the holding member is respectively disposed on the right side and the left side in the multi joint link width direction, and the holding members on the left side and the right side are connected with each other and are integrally rotatable with respect to the at least one part of the plurality of link members. Because the holding members on the left side and the right side are rotated at the same angle, the excessive force can be released in the same way on both the left and right sides.

According to the cable protection and guide device of the third aspect of the present invention, in addition to the effects of the first aspect, the holding member is respectively disposed on the right side and the left side in the multi joint link width direction, and the holding members on the left side and the right side are independently rotatable with respect to the at least one part of the plurality of link members. Since the holding members are rotated respectively to a degree corresponding to the excessive forces generated on the left and right sides, the excessive forces can be released on both the left and right sides.

For example, when cables having different outer diameters are respectively disposed on the left and right sides, different excessive forces and repulsion forces are generated on the left and right sides, and the holding members are rotated respectively to a degree corresponding to the excessive forces generated on the left and right sides, so as to deal with the excessive forces and repulsion forces.

According to the cable protection and guide device of the fourth aspect of the present invention, in addition to the effects of any one of the first to the third aspects, the engaging groove is disposed on the cylindrical base portion of the holding member and extends in the circumferential direction of the cylindrical base portion, which is the rotation direction of the holding member. When the cylindrical base portion is inserted into the circular through hole, the engaging protrusion of the retaining member engaged with the at least one part of the plurality of link members is engaged with the engaging groove of the cylindrical base portion. Thus, the holding member is allowed to rotate but the movement of the holding member in a transverse direction of the link member is restricted, thereby preventing the holding member from coming off the link member.

According to the cable protection and guide device of the fifth aspect of the present invention, in addition to the effects of any one of the first to the fourth aspects, the holding member is formed of a flexible material. When the holding member comes in contact with the support surface of the support body which serves as a reference surface during movement, the holding member is flexed to absorb the impact. Hence, the holding member of the present invention can reduce the noise, as compared with a holding member made of an inflexible material.

DESCRIPTION OF THE EMBODIMENTS

Figure 1:
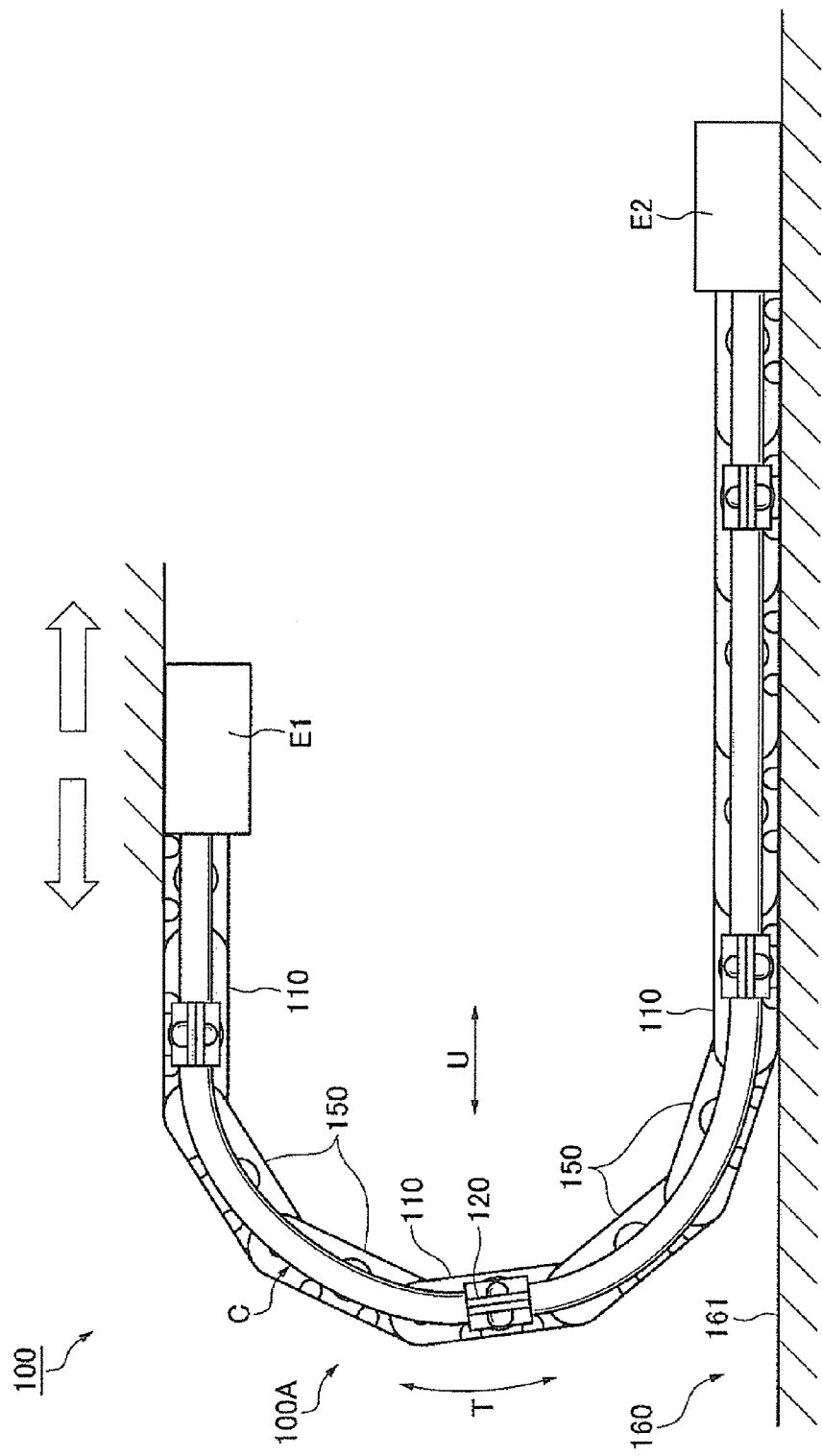
FIG. 1 is a schematic view illustrating a cable protection and guide device of the first embodiment of the present invention.

A cable protection and guide device of the present invention is not particularly limited as long as the cable protection and guide device includes a multi joint link formed by connecting a plurality of link members in a cable longitudinal direction and is capable of performing a linear position to be in contact with a support surface of a support body and a flexional position to be separated from the support surface, to guide a cable or the like from a cable fixed end to a cable movable end, wherein the multi joint link includes the plurality of link members and a holding member attached to at least one part of the plurality of link members for holding the cable; the at least one part of the plurality of link members includes a connection pin formed at one end side thereof in the cable longitudinal direction, a pin hole formed at the other end side thereof in the cable longitudinal direction to be rotatably engaged with the connection pin, and a circular through hole penetrating the at least one part of the plurality of link members in a multi-joint link width direction between the connection pin and the pin hole in the cable longitudinal direction; the holding member includes a cylindrical base portion engaged with the circular through hole, and a holding portion integrally formed with the cylindrical base portion, wherein the holding portion extends outward from the cylindrical base portion in the multi joint link width direction and is bifurcated for holding the cable from a multi-joint link flexional inner side and a multi-joint link flexional outer side; and the holding member is rotatable with respect to the at least one part of the plurality of link members, thereby preventing abrasion of the cable skin of the cable and holding the position of the multi joint link with high precision.

For example, the material of the link member used in the cable protection and guide device of the present invention may be a synthetic resin, such as engineering resin, etc., or a metal, such as aluminum, etc.

In addition, the shape of the link member is not particularly limited as long as the link members can be connected with one another in the cable longitudinal direction and be moved relatively by bending back the cable between the cable fixed end and the cable movable end in the cable longitudinal direction.

Also, the cable is not particularly limited and may be a flexible linear object, such as an electric cable that is used for supplying electric power or transmitting signals, or a hose for conducting material containing fluid in machines.

Moreover, the holding portion of the holding member may extend outward from the cylindrical base portion in the multi joint link width direction, and the holding portion may be disposed to extend in only one direction or both directions of the multi-joint link width direction.

The holding portion that extends in only one direction of the multi joint link width direction may be disposed on both the left and right sides.

First Embodiment

A cable protection and guide device 100 of the first embodiment of the present invention is described hereinafter.

As shown in FIGS. 1 to 6C, the cable protection and guide device 100 of the first embodiment of the present invention is provided in a machine (not shown in the figures), which includes the cable C, and used for protecting and guiding the cable C.

The aforementioned machine is a semiconductor fabrication apparatus, a pharmaceutical development and test apparatus, a vehicle door opening and closing device, or a machine tool, for example.

The cable protection and guide device 100 includes a multi joint link 100A that is formed by connecting a plurality of link members (110, 150) in a cable longitudinal direction T. The cable protection and guide device 100 is disposed to guide the cable C from a cable fixed end E2 to a cable movable end E1, and is configured in a linear position to be in contact with a support surface 161 of a support body 160 and is configured in a flexional position to be separated from the support surface 161.

Furthermore, the multi joint link 100A includes a first link member 110 and a second link member 150 serving as the plurality of link members, and holding members 120. The holding members 120 are attached to the first link member 110, which serves as at least one part of the plurality of link members, to hold the cable C.

Here, the first link member 110 is the part that the holding members 120 are attached to.

The second link member 150 is the part that the holding members 120 are not attached to.

The structure of the second link member 150 is substantially the same as the structure of the first link member 110. The only difference is that the second link member 150 does not have the below-described circular through hole 113, or alternatively the second link member 150 has the circular through hole 113 but the holding members 120 are not attached thereto. Therefore, details of the structure of the second link member 150 will be omitted.

According to the present invention, the first link member 110 may be used as at least one part of the multi-joint link 100A and connected in plural in the cable longitudinal direction T to form the multi joint link 100A.

In other words, the second link member 150 may be disposed and connected between one first link member 110 and another first link member 110, or a plurality of the first link members 110 may be connected without the second link member 150 therebetween.

The first link member 110 includes a connection pin 111, a pin hole 112, and the circular through hole 113. The connection pin 111 is formed at one end side of the first link member 110 in the cable longitudinal direction T. The pin hole 112 is formed at the other end side in the cable longitudinal direction T to be rotatably engaged with another connection pin 111. The circular through hole 113 penetrates the first link member 110 in a multi joint link width direction S between the connection pin 111 and the pin hole 112 in the cable longitudinal direction T.

The holding members 120 each include a cylindrical base portion 121 and a holding portion 122 formed integrally with the cylindrical base portion 121. The cylindrical base portion 121 is configured to be engaged with the circular through hole 113. The holding portion 122 extends outward from the cylindrical base portion 121 in the multi-joint link width direction S and is bifurcated for holding the cable C from two sides, i.e. multi-joint link flexional inner side and multi-joint link flexional outer side.

In this embodiment, a left holding member 120L is disposed on the left side in the multi joint link width direction S while a right holding member 120R is disposed on the right side in the multi-joint link width direction S.

In addition, the left holding member 120L and the right holding member 120R are rotatable with respect to the first link member 110.

In this way, the multi joint link 100A and the cable C have approximately the same curvature radius in the flexional position, and the left holding member 120L and the right holding member 120R hold the cable C such that the cable C does not slide relative to the left holding member 120L and the right holding member 120R.

In comparison with the conventional structure that the interior of the link member is made hollow where the cable C is inserted therethrough, the link members (110, 150) of the present invention are formed compact with less mass to have less inertial force when the link members (110, 150) stop.

Similarly, the link members (110, 150) are formed compact with less mass to have less inertial force during movement.

In other words, a motor, etc., that serves as a power source can be miniaturized.

Since the parts are reduced in size and the number of the parts is also reduced, the fabrication costs can be lowered significantly.

Moreover, in comparison with the conventional structure that the interior of the link member is made hollow where the cable C is inserted therethrough, the link members (110, 150) of the present invention are formed compact to reduce the sites where collision may occur between the link members (110, 150) during movement, and thereby reduce collision noise.

Besides, in the situation of disposing multiple cables C, the cables C are arranged in parallel to each other along the multi-joint link width direction S and have approximately the same curvature radius when the cables C are bent.

Additionally, in the situation that multiple cables C are disposed and held at two sides along the multi-joint link width direction S, a repulsion force due to a bending resistance of the cables C, which is generated by holding the cables C at one side, is compensated or reduced by a repulsion force generated in the same way at the other side of the width direction.

In other words, the forces at two sides of the multi joint link width direction S are well balanced to prevent twisting the multi-joint link 100A and to smoothen the bending of the multi joint link 100A.

Moreover, even if the position change between the linear position and the flexional position imposes an excessive force on the cable C, the left holding member 120L and the right holding member 120R receiving the excessive force are automatically rotated with respect to the first link member 110 in a direction for releasing the excessive force, so as to release the excessive force.

For example, at a part of the multi-joint link 100A that changes from the linear position to the flexional position or conversely changes from the flexional position to the linear position, an excessive force may be generated on the cable C due to a displacement difference caused by polygonal motion.

By making the left holding member 120L and the right holding member 120R rotatable with respect to the first link member 110, the left holding member 120L and the right holding member 120R are rotated automatically with respect to the first link member 110 in a direction to release the excessive force when receiving the excessive force.

In other words, the left holding member 120L and the right holding member 120R do not undertake the excessive force but rotate in compliance with the excessive force.

Hence, the aforementioned repulsion force is avoided.

Figure 5A:
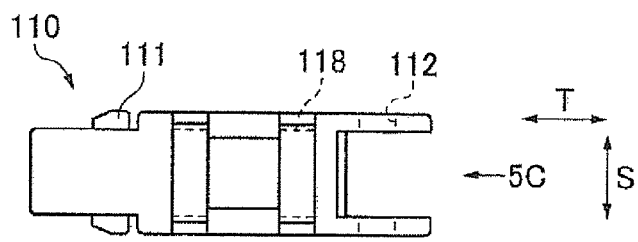
FIG. 5A is a schematic view of a first link member of the first embodiment of the present invention when viewed from a multi-joint link flexional outer side.
Figure 5B:
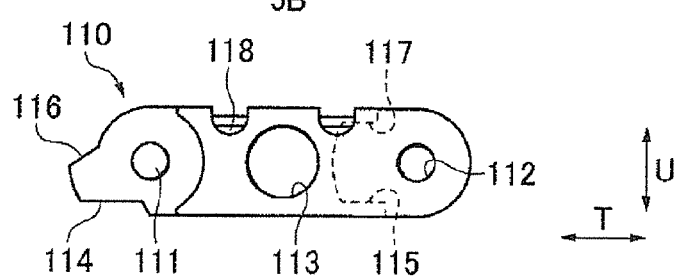
FIG. 5B is a schematic view from the direction 5B of FIG. 5A.
Figure 5C:
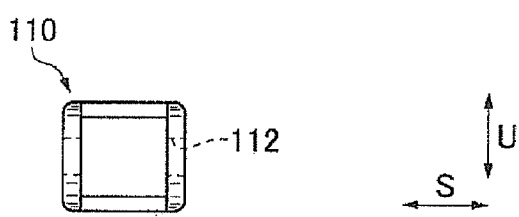
FIG. 5C is a schematic view from the direction 5C of FIG. 5A.

To be more specific, as shown in FIGS. 5A to 5C, the first link member 110 includes the connection pin 111, the pin hole 112, the circular through hole 113, a one end side linear position holding surface 114, an other end side linear position holding surface 115, a one end side flexional position restricting surface 116, an other end side flexional position restricting surface 117, and a claw engaging recess 118.

Among the above, the connection pin 111 is disposed at one end side of the first link member 110 in the cable longitudinal direction T and protrudes toward two sides of the multi-joint link width direction S.

The pin hole 112 is formed at the other end side of the first link member 110 in the cable longitudinal direction T to be rotatably engaged with the connection pin 111 of the adjacent second link member 150 (or another first link member 110) in the cable longitudinal direction T.

In addition, the circular through hole 113 is formed to penetrate the first link member 110 in the multi-joint link width direction S between the connection pin 111 and the pin hole 112 of the first link member 110 in the cable longitudinal direction T.

Moreover, the one end side linear position holding surface 114 is formed at one end side of the first link member 110 in the cable longitudinal direction T while the other end side linear position holding surface 115 is formed at the other end side of the first link member 110 in the cable longitudinal direction T.

When the multi joint link 100A is in the linear position, the one end side linear position holding surface 114 of one first link member 110 is configured to be in surface contact with the other end side linear position holding surface 115 of the adjacent second link member 150 (or another first link member 110) in the cable longitudinal direction T.

Similarly, the one end side flexional position restricting surface 116 is formed at one end side of the first link member 110 in the cable longitudinal direction T while the other end side flexional position restricting surface 117 is formed at the other end side of the first link member 110 in the cable longitudinal direction T.

When the multi-joint link 100A is in the flexional position, the one end side flexional position restricting surface 116 of one first link member 110 is configured to be in surface contact with the other end side flexional position restricting surface 117 of the adjacent second link member 150 (or another first link member 110) in the cable longitudinal direction T.

That is, one first link member 110 and the adjacent second link member 150 (or another first link member 110) are slightly bent at an obtuse angle, and a part of the multi joint link 100A becomes the flexional position and is arc-shaped.

As a result, the cable C is bent like an arc without being folded.

For example, four claw engaging recesses 118 are formed on an outer side of the first link member 110 in a link flexional inner-outer direction, and the claw engaging recesses 118 are arranged in pair in the multi-joint link width direction S.

Figure 5D:
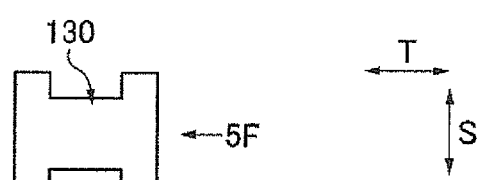
FIG. 5D is a schematic view of a retaining member of the first embodiment of the present invention when viewed from the multi joint link flexional outer side.
Figure 5E:
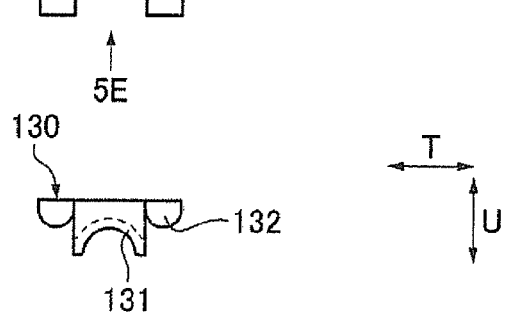
FIG. 5E is a schematic view from the direction 5E of FIG. 5D.
Figure 5F:
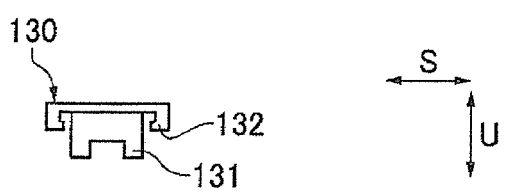
FIG. 5F is a schematic view from the direction 5F of FIG. 5D.

Moreover, as shown in FIGS. 5D to 5F, a retaining member 130 includes an engaging protrusion 131 and four claw portions 132, wherein the engaging protrusion 131 is configured to be engaged with the below-described engaging grooves 121a of the left holding member 120L and the right holding member 120R, and the four claw portions 132 are formed to be engaged with the four claw engaging recesses 118 of the first link member 110.

Figure 6A:
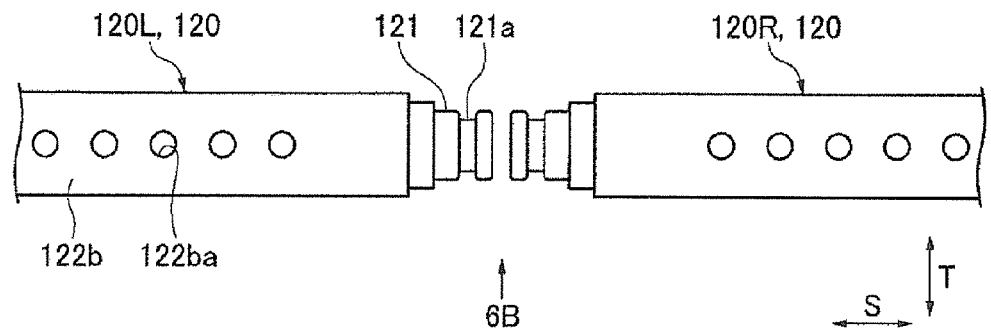
FIG. 6A is a schematic view illustrating holding members of the first embodiment of the present invention when viewed from the multi joint link flexional outer side.
Figure 6B:
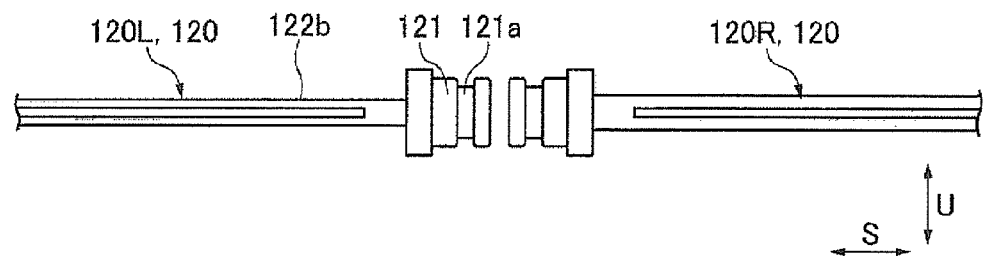
FIG. 6B is a schematic view from the direction 6B of FIG. 6A.

Further, as shown in FIGS. 6A to 6B, each of the left holding member 120L and the right holding member 120R includes the cylindrical base portion 121 and the holding portion 122 formed integrally with the cylindrical base portion 121.

Here, the left holding member 120L and the right holding member 120R are formed of a flexible material.

Accordingly, when the left holding member 120L and the right holding member 120R hit the support surface 161 of the support body 160 serving as a reference surface during movement, the left holding member 120L and the right holding member 120R are flexed to absorb the impact.

In other words, noise can be reduced.

In addition, the engaging groove 121a formed on the cylindrical base portion 121 extends in a circumferential direction of a cylinder of the cylindrical base portion 121, which is also a rotation direction of the left holding member 120L and the right holding member 120R.

Figure 4A:
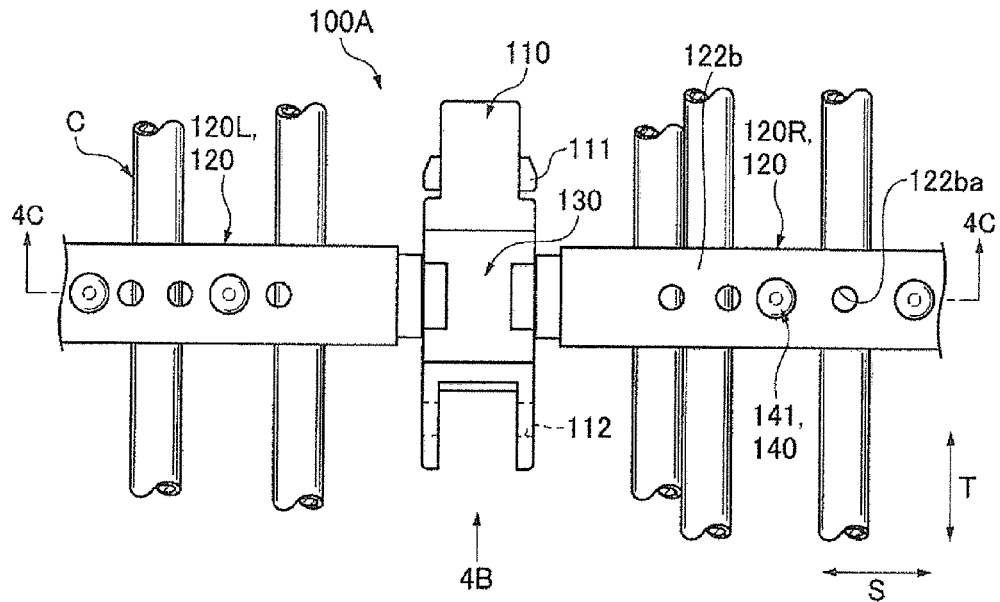
FIG. 4A is a schematic view from the direction 4A of FIG. 2.
Figure 4B:
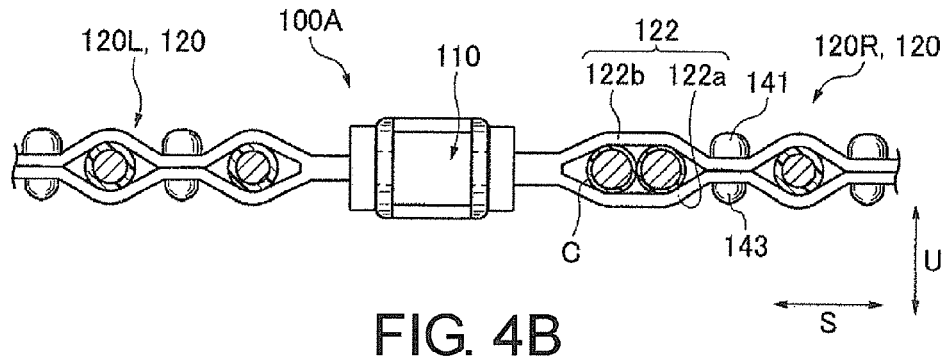
FIG. 4B is a schematic view from the direction 4B of FIG. 4A.
Figure 4C:
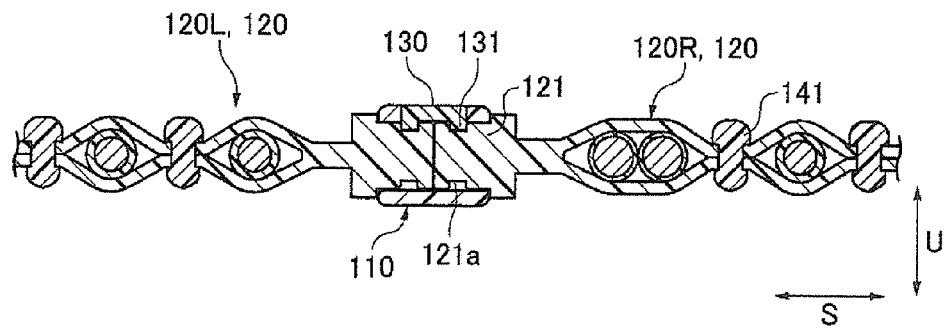
FIG. 4C is a cross-sectional view along the direction 4C-4C of FIG. 4A.

When the cylindrical base portion 121 is inserted into the circular through hole 113, the engaging protrusion 131 of the retaining member 130 engaged with the first link member 110 is engaged with the engaging groove 121a of the cylindrical base portion 121 (see FIG. 4C).

In this way, while the movement of the left holding member 120L and the right holding member 120R with respect to the first link member 110 in the multi-joint link width direction S (i.e. transverse direction) is restricted, the left holding member 120L and the right holding member 120R are allowed to rotate with respect to the first link member 110.

Figure 2:
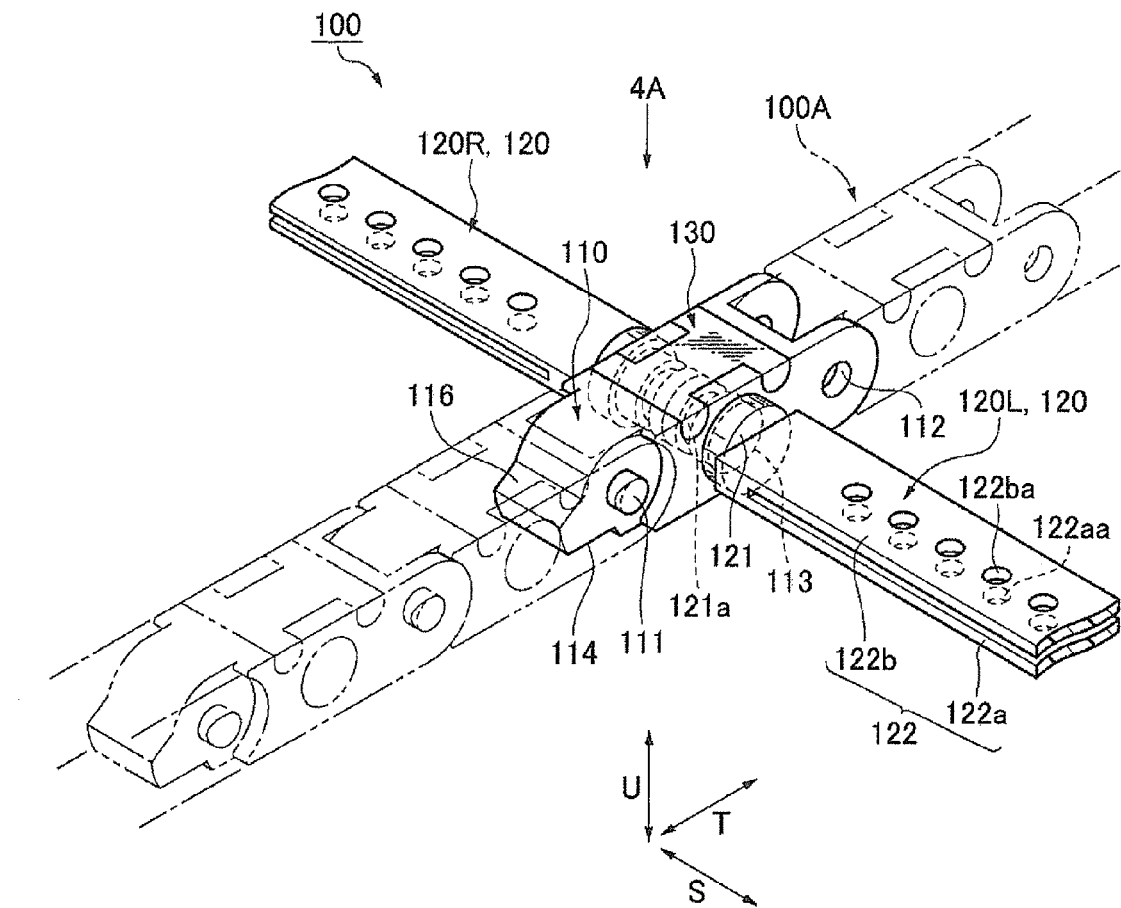
FIG. 2 is a perspective view illustrating main parts of the cable protection and guide device of the first embodiment of the present invention.
Figure 3:
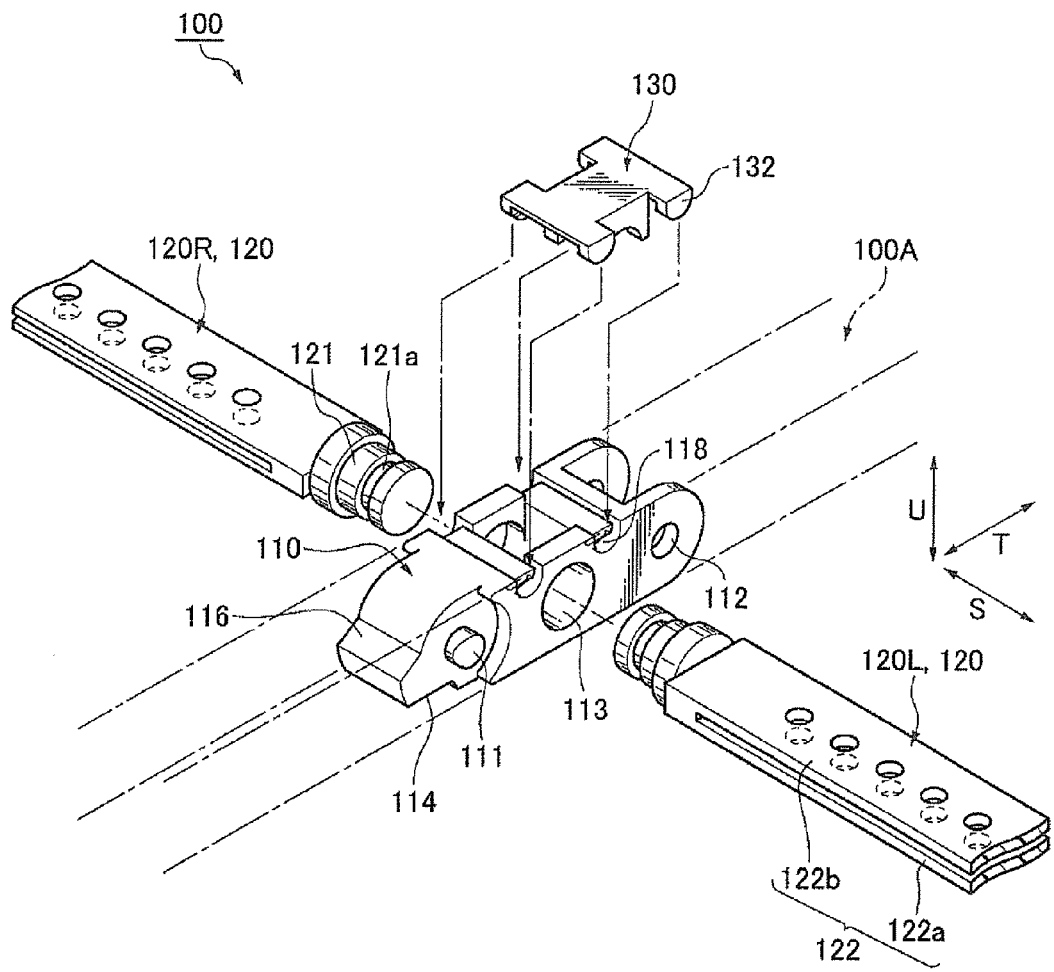
FIG. 3 is an exploded perspective view of FIG. 2.

Besides, as shown in FIG. 3, the assembly state depicted in FIG. 2 can be achieved simply by inserting the cylindrical base portion 121 into the circular through hole 113 and engaging the retaining member 130 with the first link member 110.

Furthermore, the left holding member 120L and the right holding member 120R are independently rotatable with respect to the first link member 110.

For example, when cables C having different outer diameters are respectively disposed on the left and right sides, different excessive forces and repulsion forces are generated on the left and right sides, and the left holding member 120L and the right holding member 120R are rotated respectively to a degree corresponding to the excessive forces generated on the left and right sides.

Moreover, the holding portion 122 extends outward from the cylindrical base portion 121 in the multi-joint link width direction S and is bifurcated into a flexional inner side holding part 122a and a flexional outer side holding part 122b.

The flexional inner side holding part 122a and the flexional outer side holding part 122b are configured to hold the cable C from two sides, i.e. the multi-joint link flexional inner side and the multi-joint link flexional outer side.

In this exemplary embodiment, the flexional inner side holding part 122a and the flexional outer side holding part 122b of the bifurcated holding portion 122 each has a plurality of locking holes 122aa and 122ba that are arranged at a predetermined interval along the multi-joint link width direction S and penetrate the bifurcated parts.

The locking holes 122aa and 122ba are configured for freely engaging the left holding member 120L and the right holding member 120R with another member, i.e. a pin 140.

Thus, by selecting the locking holes 122aa and 122ba in correspondence to the diameter of the cable C, an unnecessary gap between the cable C and the bifurcated holding portions 122 of the left holding member 120L and the right holding member 120R is reduced and a holding force for holding the cable C is increased.

In addition, with the pins 140 disposed between multiple cables C along the multi joint link width direction S, the cables C are arranged along the multi-joint link width direction S without contacting each other.

In other words, abrasion of the cable skin that results from contact between the cables C is prevented.

Figure 6C:
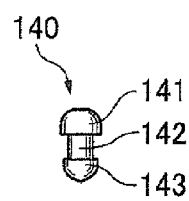
FIG. 6C is a schematic view illustrating a pin.

More specifically, as shown in FIG. 6C, the pin 140 has a large-diameter part 141, a small-diameter part 142, and a middle-diameter part 143.

A diameter of the large-diameter part 141 and a diameter of the middle-diameter part 143 are set to be larger than the diameters of the locking holes 122aa and 122ba. A diameter of the small-diameter part 142 is set to be smaller than the diameters of the locking holes 122aa and 122ba.

When the middle-diameter part 143 is pushed into the locking hole 122aa and 122ba, the locking hole 122aa and 122ba is pushed wider to allow the middle-diameter part 143 to pass through, and the flexional inner side holding part 122a and the flexional outer side holding part 122b are sandwiched by the large-diameter part 141 and the middle-diameter part 143.

In this way, the holding force for holding the cable C is increased.

Further to the above, for instance, the flexional inner side holding part 122a at one side of the bifurcated holding portion 122 may be formed with a plurality of locking holes 122aa and 122ba that are arranged at a predetermined interval along the multi joint link width direction S, and the flexional outer side holding part 122b at the other side of the bifurcated holding portion 122 may be formed with a plurality of protrusions that are arranged at a predetermined interval along the multi joint link width direction S to be engaged freely with the locking holes 122aa.

In this way, since it is not required to dispose the additional pin 140, the number of the parts can be reduced.

In this exemplary embodiment, the pin 140 is utilized to increase the holding force for holding the cable C. However, it is not necessary to use the pin 140 to fasten the cable C.

According to the technical concept, a smaller gap than the diameter of the cable C may be formed between the flexional inner side holding part 122a and the flexional outer side holding part 122b of the holding portion 122, and a harder flexional inner side holding part 122a and a harder flexional outer side holding part 122b may be formed, so that the flexional inner side holding part 122a and the flexional outer side holding part 122b can provide sufficient holding force to hold the cable C without the pin 140.

In addition, multi joint links 100A may be disposed in two or three or more rows along the multi-joint link width direction S if required.

Accordingly, even if the number of the cables C increases, the cables C can still be steadily supported.

Besides, multiple multi-joint links 100A may also be stacked in a multi-joint link flexional inner-outer direction U.

Accordingly, in the case that there is limited space in the multi-joint link width direction S, multiple cables C can still be supported.

In the cable protection and guide device 100 of the first embodiment of the present invention that is obtained according to the above, the multi joint link 100A includes the first link member 110 and the second link member 150, which serve as the plurality of link members, and the holding member 120, which is attached to the first link member 110, as at least one part of the plurality of link members, for holding the cable C. The first link member 110 includes the connection pin 111 formed at one end side thereof in the cable longitudinal direction T, the pin hole 112 formed at the other end side thereof in the cable longitudinal direction T to be rotatably engaged with the connection pin 111, and the circular through hole 113 that penetrates the first link member 110 in the multi-joint link width direction S between the connection pin 111 and the pin hole 112 in the cable longitudinal direction T. The holding member 120 includes the cylindrical base portion 121 engaged with the circular through hole 113, and the holding portion 122 formed integrally with the cylindrical base portion 121, wherein the holding portion 122 extends outward from the cylindrical base portion 121 in the multi-joint link width direction S and is bifurcated for holding the cable C from the multi joint link flexional inner side and the multi joint link flexional outer side, and the holding member 120 is rotatable with respect to the first link member 110. Thus, abrasion of the cable skin of the cable C can be prevented and, when compared with the conventional structure that the interior of the link member is made hollow where the cable C is inserted therethrough, the position of the multi joint link 100A can be held with high precision, the output of the power source of the device can be reduced, the fabrication costs can be significantly lowered, the collision noise can be reduced, problems such as breaking of the cable C resulting from the excessive force on the cable C caused by different curvature radii can be avoided, the forces that twist the multi-joint link 100A in certain directions can be mostly nullified, and damage of the cable C due to the influence of the excessive force can be prevented.

Furthermore, the holding member 120 is respectively disposed on the right side and the left side in the multi joint link width direction S, and the left holding member 120L and the right holding member 120R are connected with each other to be integrally rotatable with respect to the at least one part of the plurality of link members, so as to release the excessive forces in the same way on both the left and right sides.

Moreover, the engaging grooves 121a that are respectively disposed on the cylindrical base portions 121 of the left holding member 120L and the right holding member 120R extend in the circumferential direction of the cylinder of the cylindrical base portions 121, which is also the rotation direction of the left holding member 120L and the right holding member 120R. When the cylindrical base portions 121 are inserted into the circular through hole 113, the engaging protrusion 131 of the retaining member 130 engaged with the at least one part of the plurality of link members is engaged with the engaging grooves 121a of the cylindrical base portions 121. Therefore, the left holding member 120L and the right holding member 120R can be prevented from coming off the first link member 110.

Additionally, the left holding member 120L and the right holding member 120R are formed of a flexible material. In comparison with a holding member made of an inflexible material, the left holding member 120L and the right holding member 120R are more effective in reducing noise.

Second Embodiment

Further to the above, a cable protection and guide device 200 of the second embodiment of the present invention is described hereinafter.

In the cable protection and guide device 200 of the second embodiment, the left holding member 120L and the right holding member 120R of the cable protection and guide device 100 of the first embodiment are connected with each other to rotate integrally. Since the cable protection and guide device 200 and the cable protection and guide device 100 of the first embodiment have many elements in common, detailed descriptions of the common elements are not repeated hereinafter and the common elements are assigned with reference numerals starting with 2 (i.e. 2XX) in the second embodiment whereas the last two digits "XX" remain unchanged.

Figure 7A:
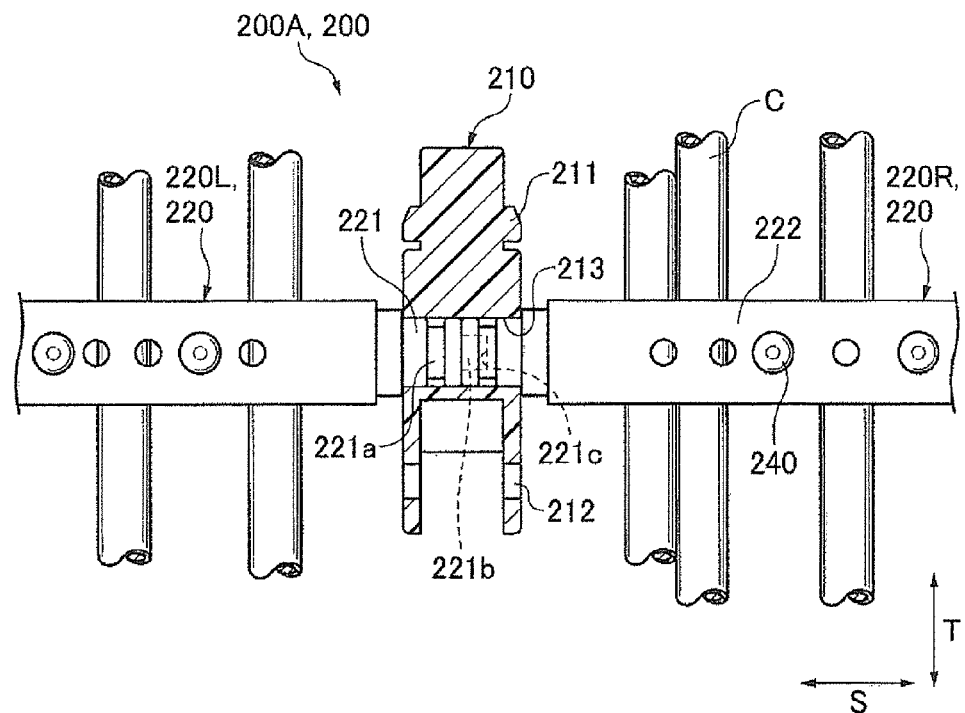
FIG. 7A is a partial cross-sectional view of a multi-joint link and a cable of the second embodiment of the present invention when viewed from the multi-joint link flexional outer side.
Figure 7B:
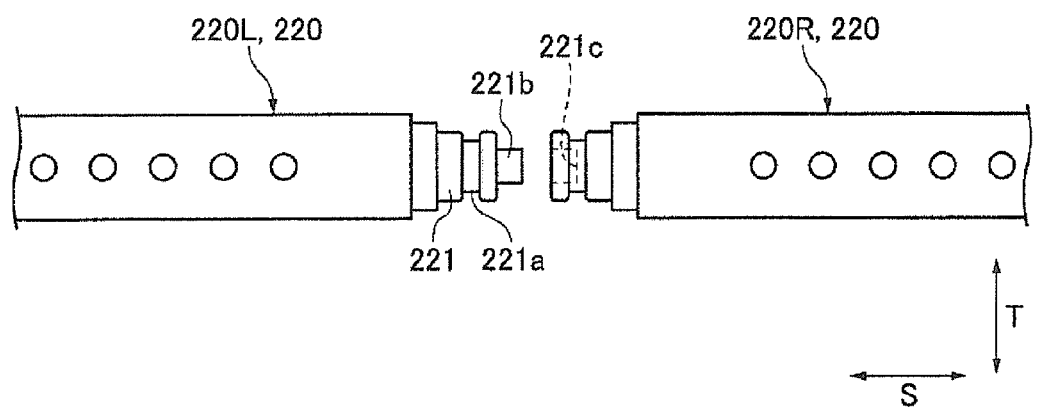
FIG. 7B is a schematic view of holding members of the second embodiment of the present invention when viewed from the multi-joint link flexional outer side.

In the cable protection and guide device 200 of the second embodiment of the present invention, as shown in FIG. 7A and FIG. 7B, holding members 220 are respectively disposed on the right side and the left side in the multi joint link width direction S, and a left holding member 220L and a right holding member 220R are connected with each other to be integrally rotatable with respect to a first link member 210.

Therefore, the left holding member 220L and the right holding member 220R rotate at the same angle.

More specifically, the left holding member 220L has a quadrangular engaging protrusion 221b, for example.

On the other side, the right holding member 220R has a quadrangular engaging recess 221c, for example.

The engaging protrusion 221b of the left holding member 220L is configured to be fit into the engaging recess 221c of the right holding member 220R.

In this embodiment, the engaging recess 221c and the engaging protrusion 221b to be fit into the engaging recess 221c are both quadrangular. However, the engaging protrusion and the engaging recess may be formed in other shapes as long as they can be connected without rotating with respect to each other.

In the cable protection and guide device 200 of the second embodiment of the present invention that is obtained according to the above, the holding members 220 are respectively disposed on the right side and the left side in the multi joint link width direction S, and the left holding member 220L and the right holding member 220R are connected with each other to be integrally rotatable with respect to the first link member 210 serving as the at least one part of the plurality of link members. Therefore, the cable protection and guide device 200 is effective in releasing the aforementioned excessive forces in the same way on the left and the right sides.

What is claimed is:

1. A cable protection and guide device, comprising:

a multi joint link formed by connecting a plurality of link members in a cable longitudinal direction, wherein the cable protection and guide device guides a cable from a cable fixed end to a cable movable end, the multi-joint link comprises a liner portion and a flexional portion, wherein part of the link members are in contact with a support surface of a support body to form the linear portion and another part of the link members are slightly bent at an obtuse angle to form the arc-shaped flexional portion, and the flexional portion is separated from the support surface, the linear portion comprises a multi-joint link linear inner side and a multi-joint link linear outer side and the flexional portion comprises a multi-joint link flexional inner side and a multi-joint link flexional outer side, the multi-joint link linear inner side is connected to the multi-joint link flexional inner side, the multi-joint link linear outer side is connected to the multi-joint link flexional outer side, and at least part of the multi-joint link linear outer side is in contact with the support surface, wherein the multi-joint link comprises the plurality of link members and a holding member attached to at least one part of the plurality of link members for holding the cable, wherein the at least one part of the plurality of link members comprises a connection pin formed at one end side of the at least one part of the plurality of link members in the cable longitudinal direction, a pin hole formed at the other end side of the at least one part of the plurality of link members in the cable longitudinal direction to be rotatably engaged with the connection pin of another link member, and a circular through hole penetrating the plurality of link members in a multi-joint link width direction between the connection pin and the pin hole in the cable longitudinal direction, and the multi-joint link width direction is perpendicular to the cable longitudinal direction, wherein the holding member comprises:
- a cylindrical base portion engaged with the circular through hole; and
- a holding portion formed integrally with the cylindrical base portion, and the holding portion extending outward from the cylindrical base portion in the multi-joint link width direction and being bifurcated for holding the cable from the multi-joint link flexional inner side and the multi-joint link flexional outer side, and wherein the holding member is rotatable with respect to the at least one part of the plurality of link members.

2. The cable protection and guide device according to claim 1, wherein the holding member is respectively disposed on a right side and a left side in the multi-joint link width direction, and the holding members on the left side and the right side are connected with each other and are integrally rotatable with respect to the at least one part of the plurality of link members.

3. The cable protection and guide device according to claim 2, wherein an engaging groove is disposed on the cylindrical base portion of the holding member and extends in a circumferential direction of the cylindrical base portion, which is a rotation direction of the holding member, and
when the cylindrical base portion is inserted into the circular through hole, an engaging protrusion of a retaining member engaged with the at least one part of the plurality of link members is engaged with the engaging groove of the cylindrical base portion.

4. The cable protection and guide device according to claim 2, wherein the holding member is formed of a flexible material.

5. The cable protection and guide device according to claim 1, wherein the holding member is respectively disposed on a right side and a left side in the multi-joint link width direction, and the holding members on the left side and the right side are independently rotatable with respect to the at least one part of the plurality of link members.

6. The cable protection and guide device according to claim 5, wherein an engaging groove is disposed on the cylindrical base portion of the holding member and extends in a circumferential direction of the cylindrical base portion, which is a rotation direction of the holding member, and
when the cylindrical base portion is inserted into the circular through hole, an engaging protrusion of a retaining member engaged with the at least one part of the plurality of link members is engaged with the engaging groove of the cylindrical base portion.

7. The cable protection and guide device according to claim 5, wherein the holding member is formed of a flexible material.

8. The cable protection and guide device according to claim 1, wherein an engaging groove is disposed on the cylindrical base portion of the holding member and extends in a circumferential direction of the cylindrical base portion, which is a rotation direction of the holding member, and
when the cylindrical base portion is inserted into the circular through hole, an engaging protrusion of a retaining member engaged with the at least one part of the plurality of link members is engaged with the engaging groove of the cylindrical base portion.

9. The cable protection and guide device according to claim 8, wherein the holding member is formed of a flexible material.

10. The cable protection and guide device according to claim 1, wherein the holding member is formed of a flexible material.

* * * * *